United States Patent [19]

Marvel, Sr. et al.

[11] Patent Number: 4,663,370

[45] Date of Patent: May 5, 1987

[54] FIBERIZED JOINT/CRACK SEALANT COMPOSITION

[75] Inventors: John B. Marvel, Sr., Newark, Del.; James P. Modrak, Conyers, Ga.

[73] Assignee: Hercules Incorporated, Wilmington, Del.

[21] Appl. No.: 785,295

[22] Filed: Oct. 7, 1985

[51] Int. Cl.⁴ .............................................. C08L 95/00
[52] U.S. Cl. .................................... 523/221; 523/334; 524/60; 524/61; 524/68
[58] Field of Search ................. 523/334, 221; 524/60, 524/61, 68, 221

[56] References Cited

U.S. PATENT DOCUMENTS 3,503,311 3/1970 Gagle et al. ............................ 94/18
3,505,260 4/1970 Woodruff ........................... 260/28.5
4,422,878 12/1983 Fry ...................................... 106/219

Primary Examiner—Herbert J. Lilling
Attorney, Agent, or Firm—John E. Crowe

[57] ABSTRACT

Polyolefin reinforced asphalt paving and sealing composition containing straight chain unsaturated fatty acid having up to 30 weight percent rosin as a plasticizer, plus an adhesion control component comprising high density polyolefin fines; and a corresponding method for controlling high temperature tracking and washing characteristics without aggravating mixing or plugging problems, by replacing, at least in part, regular inorganic aggregate such as sand with high density polyolefin fines.

11 Claims, No Drawings

FIBERIZED JOINT/CRACK SEALANT COMPOSITION

BACKGROUND

Many miles of existing highways utilize asphalt-containing materials in combination with various aggregates such as gravel, crushed stone, and sand. In addition, numerous additional miles of roads are built each year, in which asphalt serves as one of the major components. The continued widespread use of such material, however, depends susbstantially upon cost, durability of the paved surface, the frequency and the nature of required maintenance in response to weather and vehicular-induced damage.

Generally speaking, when repair or resurfacing is carried out, hot asphalt or asphalt emulsion are applied in one form or another to fill road cracks and joints, as waterproof underlayers between old and new paving surfaces, and as the external surfacing material. For each purpose, however, the amount and fineness of aggregate, the nature and amount of curing and thickening agents and the presence and concentration of other additives can vary widely, depending on the geographic location, traffic density, and required ease of application under ambient conditions.

By way of example, asphalt paving compositions exhibiting flexibility, strength and toughness can be obtained even under zero conditions by including, within the composition, about 1%–10% by weight of organic staple fiber such as a polyolefin or polyester. Addition of such reinforcing fiber to asphalt, however, can also have a negative effect since it dramatically reduces pumpability and workability of the resulting composition. In normal usage, for example, hot asphalt concrete mixes are generally heated to about 230° F. to 245° F. before lay-down. Upon addition of reinforcing fiber, however, the composition temperature must be raised at least about 10° higher to obtain acceptable lay-down and compaction characteristics. This additional heating is generally undesirable due to energy cost factors and possible heat-induced fiber degredation.

It has also been found that the above pumpability and workability problems can be minimized by also including about 0.5%–10% by weight of a straight chain unsaturated fatty acid containing up to about 30 weight % rosin, such as tall oil fatty acids.[*] Such advantage is paid for, however, by substantially lowered resistance to tracking and increased washing effect under hot summer conditions.

[*] Commercially available from Hercules Incorporated as Pamak ® tall oil fatty acids. See also Hackh's Chemical Dictionary 4th Ed. pg. 660 and Condensed Chemical Dictionary, 10th Ed. pg. 992.

This latter problem can be controlled to some extent by the increased use of fine aggregate (i.e., sand) and filler (i.e., talc). Such materials however are not easily uniformly dispersed or kept in such condition within the body of an asphalt paving or sealing composition. Sand, for instance, begins to settle and irregular particles tend to block applicator passages.

It is an object of the present invention to help control the tracking and washing characteristics of fiber-reinforced asphalt paving and sealing compositions containing unsaturated fatty acids and rosin additives.

It is a further object of the present invention to avoid the use of excessive amounts of inorganic aggregate and filler, particularly fine aggregate, to promote stability of tall oil fatty acid-containing fiber reinforced asphalt-based paving and sealing compositions under a combination of summer heat and vehicular pounding.

THE INVENTION

The above objects are realized and control over tracking and washing characteristics of a fiber reinforced asphalt paving and sealing composithon containing up to about 10% by weight of straight chain unsaturated fatty acid containing up to about 30 weight % rosin as a plasticizer, is achieved by incorporating into the described composition an active amount of an adhesion control component comprising high density polyolefin fines.

Asphalt-based paving and sealing compositions suitable for the purposes of the present invention generally comprise:

(a) up to about 10% by weight of a staple polyolefin or polyester reinforcing fiber, the reinforcing fiber component for purposes of the present invention being preferably a crystalline homopolymer or copolymer of propylene or ethylene. These usefully include polypropylene having a viscosity average molecular weight of about 140,000–280,000 or higher, with a preferred fiber length of about 1 mm–20 mm, and a diameter of about 0.1–5.0 mils or higher. Suitable commercially-obtainable polymeric fibers of this type are used commercially, for instance, by Hercules Incorporated under the mark Hercules Fiber Pave TM 3010 and 4010.

The amount of reinforcing fiber can vary widely, depending upon intended use. As noted above, however, an upper concentration of up to about 10.0 weight percent by weight of base component is generally found useful. In particular, the active fiber concentration can include about 0.25–10.0 weight percent, but is preferably limited to about 0.25–0.75 by weight of asphalt base components for slurry seal, 4.0–10.0 weight percent when used as crack sealant, and about 0.25–1.5 weight percent for chip sealant purposes, assuming that substantial pumping and/or spreading of the composition will be provided to assure adequate application onto and into the surface being treated. Moreover, in each case, it is assumed that curing time must be of reasonably limited duration after lay down;

(b) up to about 10% by weight and preferably 0.25%–10% or less of a plasticizer mixture comprising straight chain unsaturated fatty acid(s) containing up to about 30 weight percent rosin is found useful to minimize a characteristic loss of tensile strength and brittleness associated with the fiber reinforced composition under zero or sub-zero temperature conditions.

Such indicated straight chain unsaturated fatty acids usefully comprise mixtures of about 70–100% by weight mono- and di-unsaturated fatty acids, the fatty acid component generally consisting of about 40–50% diunsaturated acids. This component is readily obtainable, for instance, by distillation of Tall Oil[*] as a by-product from sulfite pulping processes.

The above rosin ester material is found to be especially useful when employed as an additive for asphalt or asphalt/rubber compositions in a concentration range of about 0–2.5 weight percent calculated by weight of base component for slurry seal and chip seal purposes and 0–5 weight percent in crack sealant compositions. The component materials are obtainable commercially from Hercules Incorporated.[**]

[**] Pamak ® fatty acids and Foral ® 85 rosin and rosin esters.

(c) Aggregate, preferably of the medium-to-fine variety is usefully present in amounts up to about 10% by weight or higher, the amount depending upon the intended use of the fiber-reinforced composition.

In the case of crack sealant compositions, for instance, an aggregate ranges from about 0-10 and preferably up to 7.5 weight percent of fine aggregate such as sand, by weight of base component (along with other fines), is generally sufficient. Aggregate components serve as supplemental thickening agent as well as promoting durability of the resulting surface.

Where the asphalt composition is utilized as slurry seal, however, it is sometimes advantageous to use a much higher concentration of medium-to-heavy aggregate, depending on the temperature and method of application desired.

Aggregate concentration used for chip seal, on the other hand, can usefully vary from about 50-1000 weight percent, and are preferably used at a concentration of about 100 weight percent of mixed stone, all or a substantial amount of which is generally added separately to form the composition "in situ".

The degree of difficulty in curing such materials generally depends upon the choice of base components, the thickness and viscosity of the composition and the techniques used to apply them to a surface.

Suitable aggregate material includes, for instance, clean dry sieved material ranging from about #4 to #200 sieve size blended to conform to 1SSA type II gradations. In each case using hot viscous asphalt, however, it is not easy to keep aggregates in suspension or evenly admixed for any substantial period of time; and (d) an active amount of an adhesion control component as described generically within the present invention comprises high density polyester polypropylene or polyethylene fines generally within a concentration range of about 0.25%–10%, and preferably within a range of about 0.5%–7% by weight of composition.

While the above adhesion control components are conveniently described as "fines", the term, as here applied, includes chopped homopolymers or copolymers of polyester or polyolefin such as polypropylene or polyethylene conveniently obtained, for instance, as by-products in the manufacture of non-woven fabric and also includes such particles in the form of water-dispersible pulps.(*3)

*3 Obtainable commercially, for instance, from Hercules Inc. under the mark Pulpex® E and Pulpex P.

Size-wise, such adhesion control components usefully have a particle diameter not exceeding about 200 microns, preferably within the range of about 20-40 microns, and a length not exceeding about 1.5 mm and preferably about 0.5 mm–1.5 mm.

For purpose of the present invention, asphalt material used as base component for paving or sealing purposes usefully includes bituminous substances generally defined as naturalor petroleum-refiner asphalts, asphaltites, pyrogenous distillates, bottom stock, as well as other pyrogenous residues such as pyrogenous asphalts, petroleum pitch, coal tar pitch and mixtures thereof. Such material is conveniently characterized by a penetration value of from 0-300 or higher (ASTM D-5-51), and preferably about 40-300, with a softening point in the range of about 90° F.–250° F. (ASTM D-36-26), and Preferably between 100° F.–240° F.

Suitable base component materials are further exemplified, for instance, in Column 3 of U.S. Pat. No. 2,478,162 of Sommers and in Column 2 of U.S. Pat. No. 3,738,853 of Kopvillem et al.

Also included as base material components within the scope of the present invention are latex copolymers of styrene and butyl acrylate which are obtainable commercially, for instance, as Rohm & Haas EL 805 alone or combined with hydrogenated rosin esters.(*4)

*4 Obtainable commercially from Hercules Incorporated under the mark FORAL® AX 85 and 105.

Also commercially available and of interest for purposes of the above invention, are cured latex materials such as PolySar® 298, which can be conveniently combined with about 99–70 weight percent asphalt material to form a base component. Also useful for purposes of the present invention, are nonlatex-type components such as acrylic copolymers in combination with comparable amounts of asphalt and/or rubber material and the above listed reinforcing fiber material, inclusive of crystalline polypropylene.

In addition to the above-listed components it is also found useful, on occasion, to utilize curing and thickening agents such as one or more of dicalite clay, Portland cement, lime and alum. These, in concentrations of about 0–5 weight percent, and particularly 0.5–2.0 weight percent, are found helpful in the presence of substantial amounts of the above-defined base components. In general, the presence and choice of curing and thickening agents in conjunction with such base materials depends substantially upon the amount of base components used, and the intended functional purpose of the surface. Where, for instance, sealing properties require a high concentration of rubber in the asphalt/rubber base component, it is sometimes found convenient to employ a curing agent such as alum, Portland cement, or combination of the two. Where, on the other had, 85% or more of the base component is asphalt, then Portland cement alone is generally found satisfactory. In the former situation, however, the hiatus between addition of curing agent and lay down of the composition should be minimized.

Where the asphalt composition is applied in the form of an emulsion, particularly when using asphalt in combination with polymeric additives, it is found that emulsifying agents can usefully be of the cationic, nonionic or anionic type, or various combinations thereof, and usefully employed in an active amount varying from about 0.05–5.0 weight percent by weight of base component.

A particularly useful, although not exclusive, class of cationic emulsifying agents, for instance, includes salts of organic bases and salts of heterocyclic nitrogen bases. Of the former, the cation portion usefully contains at least one basic nitrogen atom and the cation portion has a long chain alaphatic substituent of about 12–24 carbon atoms. Suitable compounds of this type include, for instance, n-dodecyltrimethylammonium chloride, n-dodecyltriethyl-ammonium hydroxide n-octadecyltri-n-butylammonium nitrate, n-eicosyltrimethylammonium chloride, n-tetracosyltrimethyolammonium acetate, and n-octadecylpropyldimethylammonium salicylate.

Non-ionic agents can include compounds within the general formula:

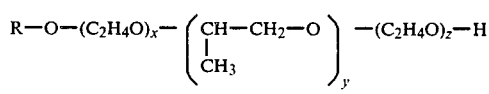

where R is defined as a hydrogen, aryl, or alkylaryl radical; and x, y and z are defined as intergers, such that (1) when x is zero, y is also zero, z is 6–11, and (2) when x and y are greater than zero, the sum of x and z is within the range of 20-40, and y is 40-60; also compounds of the formula

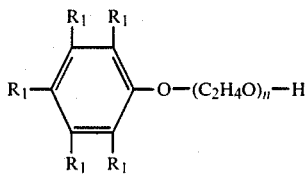

where $R_1$ is individually defined as hydrogen or alkyl group having 1 to 25 carbon atoms, and n is an integer of 20-60; or a compound of the formula

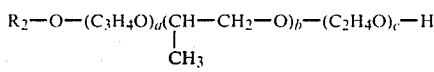

where a and c are defined as integers greater than zero whose sum is 50-350, b is an integer within 40-60, and $R_2$ is defined as a hydrogen or

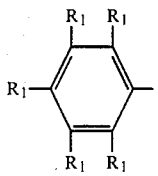

group, and anionic emulsifying agents can include, for instance, sulfonates, particularly alkyl and aryl sulfonates such as p-dodecylbenzene sodium sulfae, n- or iso-p-octylphenoxypoly (ethyleneoxy) ethanol, sodium sulfonates, sodium isopropylnaphthalene sulfonate, sodium tetrahydronaphthalene sulfonate and methylnaphthalene sodium sulfonate (Petro Ag); and sulfates such as sodium cetyl sulfate (n-hexadecylsodiumsulfate), ammonium lauryl sulfate, sodium tridecyl sulfate; and the phosphates: alkylpolyphosphates, complex amidophospho salts, as well as esters and others such as sodium diamyl sulfosuccinate and disodium-N-octadecyl sulfosuccinate.

Additional emulsifying agents are exemplified, for instance, in Columns 3-5 of U.S. Pat. No. 3,505,260 of Woodruff.

The emulsion vehicle used for purposes of the present invention essentially consists of water, but, as noted above, can include soluble additives (organic and inorganic) known to the art to enhance curing, flexibility, stability, or other specifically-desired properties. Normally up to about 10 to 15 weight percent water, based on base component of the emulsion is found sufficient, while smaller amounts (from 0.10-10.0 weight percent are preferred for crack seal and chip seal purposes.

The improved tracking and washing characteristics of polyolefin fiber reinforced asphalt based compositions are further demonstrated in the following examples:

EXAMPLE I (A) Five thousand grams of paving grade petroleum refiner asphalt (as base component), is heated with continuous mixing in a heating kettle until fully softened and temperature stabilized at about 185° F. The material is then emulsified, in the usual manner, using steryl amine acetate as a cationic emulsifying agent at a ratio of 10 grams water/100 grams base component. The material is then thoroughly admixed with 12.5 grams of 3 denier/10 mm staple polypropylene fiber(*5), 5 grams portland cement, and 250 grams tall oil fatty acid. Three 100 ml control samples (identified as C-1, C-2, and C-3) are taken and the material evenly troweled (1/16") onto 4"×8" pyrex test plates and allowed to dry at room temperature. The control samples are dried at room temperature for one day and C-2 and C-3 placed into a hot air oven at 115° F. and 145° F. respectively for one hour prior to testing.

*5 Available commercially as Fiber Pave TM 3010 from Hercules Incorporated.

The remaining asphalt-base component is then equally divided and one half hand mixed with (a) Forty-seven (47) grams of commercially available grade A PVA-treated water dispersible high density polyethylene fiber pulp(*6) and the test product troweled (1/16") onto 4"×8" heat resistant glass test plates identified as TE-1, TE-2, TE-3 and TE-4;

*6 Pulpex ® E.

(b) The second half of the base component is similarly admixed with 47 grams of PVA-treated polypropylene fiber pulp(*7) and troweled (1/16") onto four identical 4"×8" heat resistant glass test plates identified as TP-1, TP-2, TP-3 and TP-4.

*7 Pulpex ® P.

The test plates are dried at room temperature for one day and then placed in the hot air oven for one hour at 100° F., 115° F. and 145° F. respectively.

The coated test plates are individually removed from the oven, immediately mounted on a test track, and a cured rubber-coated steel roll weighing 5.386 kg passed once over each test plate; the plate and roll surfaces are then carefully observed for indication of pick up and grooving. The results are reported in Table I below.

TABLE I

| Sample | Temperature (°F.) | Concentration (% by weight) | Tracking Observed |
|---|---|---|---|
| C-1 | 100 | 0 | Traces |
| C-2 | 115 | 0 | Substantial |
| C-3 | 145 | 0 | Very substantial |
| TE-1 | 115 | 1% | None |
| TE-2 | 145 | 1% | Traces |
| TP-1 | 115 | 1% | None |
| TP-2 | 145 | 1% | Traces |
| TE-3 | 115 | 5% | None |
| TE-4 | 145 | 5% | None |
| TP-3 | 115 | 5% | None |
| TP-4 | 145 | 5% | None |

EXAMPLE II

Example I is repeated using polypropylene fines obtained as by-products from the production of non-woven thermal bonded polypropylene material, the additive fines having an average fiber diameter of about 20 micron and a length of about 1.5 mm or less. The results obtained are found comparable to that obtained in Example I using Pulpex P as an additive.

What we claim is:

1. An asphalt paving and sealing composition comprising
   (a) about 0.25%-10% by weight of a staple polyolefin or polyester reinforcing fiber of about 1 mm-20 mm length and a diameter of about 0.1-5.0 mil;
   (b) up to about 10% by weight of straight chain unsaturated fatty acid containing up to about 30 weight % rosin;
   (c) up to about 10% by weight of aggregate; and (d) an active amount of an adhesion control component containing high density polyester or polyolefin fines;

said fines of component (d) having a particle diameter not exceeding about 200 microns and a length not exceeding about 1.5 mm.

2. The composition of claim 1 as a hot mix, in which the adhesion control component fines comprise at least one of a polyester, polyethylene, or polypropylene homopolymer.

3. The composition of claim 1 as an aqueous emulsion in which the adhesion control component comprises a polyolefin water-dispersible pulp having a particle diameter of about 20–40 microns and a length of about 0.5–1.5 mm.

4. The composition of claim 2 wherein the adhesion control component is present in the amount of about 0.25%–10% by weight of composition.

5. The composition of claim 3 wherein the adhesion control component is present in the amount of about 0.5%–7% by weight of composition.

6. In a method for controlling tracking and washing characteristics of fiber-reinforced asphalt paving and sealing compositions containing about 0.25%–10% by weight of staple polyolefin or polyester reinforcing fiber of about 1 mm–20 mm length and a diameter of about 0.1–5.0 mil and up to about 10% by weight of straight chain unsaturated fatty acid containing up to about 30 weight % rosin, the improvement comprising incorporating into said composition an active amount of an adhesion control component containing high density polyester or polyolefin fines having a particle diameter not exceeding about 200 microns and a length not exceeding about 1.5 mm.

7. The method of claim 6 wherein the reinforcing polyolefin fiber is a polyester, polypropylene, or polyethylene and the adhesion control component comprises at least one of polypropylene or polyethylene homopolymer or copolymer fines having a particle diameter not exceeding about 200 microns and a length not exceeding about 1.5 mm.

8. The method of claim 7 wherein the adhesion control component fines have a diameter of about 20–40 microns and a length of about 0.5 mm–1.5 mm.

9. The method of claim 6 wherein the paving and sealing composition is in the form of an aqueous emulsion and the polyolefin adhesion control component is introduced as a water-dispersible polypropylene fiber pulp.

10. The method of claim 6 wherein the paving and sealing composition comprises hot asphalt and the adhesion control component comprises dry polypropylene fines.

11. The method of claim 6 wherein the reinforcing fiber is a polypropylene and the polyolefin adhesion control component is a polypropylene.

* * * * *

UNITED STATES PATENT AND TRADEMARK OFFICE
CERTIFICATE OF CORRECTION

PATENT NO. : 4,663,370
DATED : May 5, 1987
INVENTOR(S) : John B. Marvel, Sr. and James P. Modrak It is certified that error appears in the above-identified patent and that said Letters Patent are hereby corrected as shown below:

Column 2, line 7 "composithon"

should read -- composition --.

Column 3, line 33 "polyester polypropylene"

should read -- polyester, polypropylene, --.

Signed and Sealed this

Eighteenth Day of August, 1987

Attest:

DONALD J. QUIGG

Attesting Officer

Commissioner of Patents and Trademarks